United States Patent

Izumi

[11] Patent Number: 5,291,549
[45] Date of Patent: Mar. 1, 1994

[54] PRIVATE BRANCH EXCHANGE AND LINE EXCHANGE METHOD

[75] Inventor: Michihiro Izumi, Kawasaki, Japan

[73] Assignee: Canon Kabushiki Kaisha, Tokyo, Japan

[21] Appl. No.: 928,635

[22] Filed: Aug. 14, 1992

Related U.S. Application Data

[63] Continuation of Ser. No. 533,860, Jun. 6, 1990, abandoned.

[30] Foreign Application Priority Data

Jun. 7, 1989 [JP] Japan .................. 1-143022
Jun. 8, 1989 [JP] Japan .................. 1-144011

[51] Int. Cl.⁵ .............................. H04M 3/02
[52] U.S. Cl. .................... 379/233; 379/212; 379/213; 370/110.1
[58] Field of Search .......... 379/201, 211, 212, 213, 379/214, 233; 370/110.1

[56] References Cited

U.S. PATENT DOCUMENTS

| | | | |
|---|---|---|---|
| 4,277,649 | 7/1981 | Sheinbein | 379/201 |
| 4,696,028 | 9/1987 | Morganstein | 379/233 X |
| 4,958,153 | 9/1990 | Murata et al. | 370/94.1 |
| 4,975,941 | 12/1990 | Morganstein et al. | 379/213 |
| 5,001,709 | 3/1991 | Sato | 370/110.1 |
| 5,008,884 | 4/1991 | Yazawa et al. | 370/110.1 |
| 5,023,868 | 6/1991 | Davidson et al. | 379/94 |
| 5,027,384 | 6/1991 | Morganstein | 379/212 X |
| 5,099,511 | 3/1992 | Matsumoto | 379/233 |

OTHER PUBLICATIONS

"SR 1000 PBX", product Reference Guide by Solid State Systems Inc., p. 13, Nov. 1987.

Primary Examiner—James L. Dwyer
Assistant Examiner—Ahmad F. Matar
Attorney, Agent, or Firm—Fitzpatrick, Cella, Harper & Scinto

[57] ABSTRACT

A private branch exchange which accommodates a plurality of extension terminals and which is arranged to effect line exchanges by specifying a destination terminal from among the extension terminals on the basis of a called-subaddress information element contained in incoming information. When the incoming information containing the called-subaddress information element is received, it is determined whether the called-subaddress information element is contained in the incoming information. If there is no called-subaddress information element, the call is refused. It is also determined whether connection with an extension terminal is possible or impossible, on the basis of the received incoming information. If the connection is impossible, information to that effect is transmitted to a calling party.

22 Claims, 8 Drawing Sheets

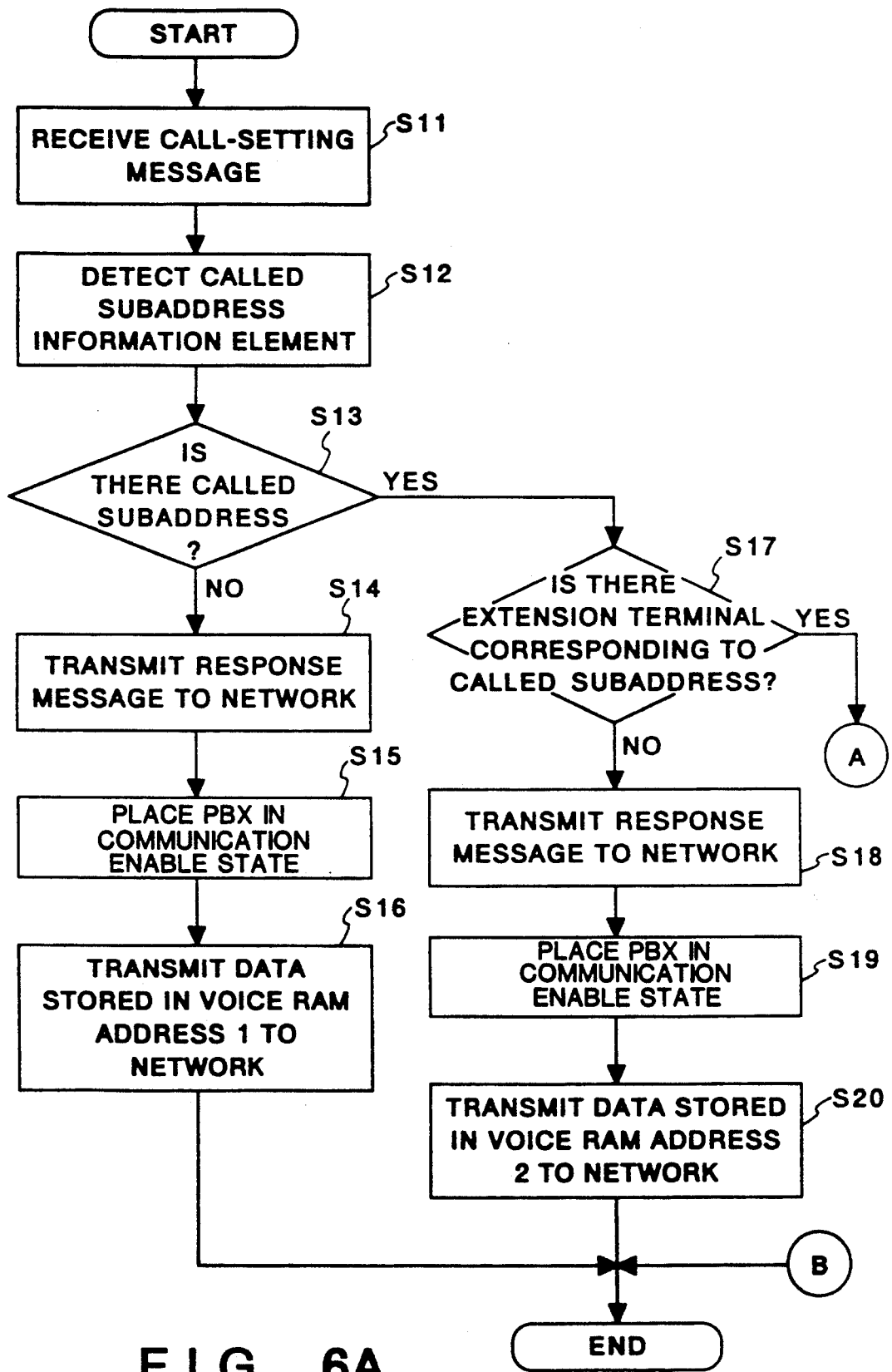
F I G. 6A

PRIVATE BRANCH EXCHANGE AND LINE EXCHANGE METHOD

This application is a continuation of application Ser. No. 07/533,860 filed Jun. 6, 1990, now abandoned.

BACKGROUND OF THE INVENTION

1. Field of the Invention

The present invention relates to a private branch exchange and a line exchange method and, more particularly, to a private branch exchange which accommodates a plurality of extension terminals and which is arranged to effect line exchanges by specifying a destination terminal from among the extension terminals on the basis of a signal transmitted from a transmitting side, as well as a line exchange method for such a private branch exchange.

2. Description of the Related Art

A general private branch exchange serves the function of transmitting a call to an extension terminal which is specified by a calling party from among a plurality extension terminals. For example, an ISDN which is a typical public digital communications network is capable of transmitting not only a destination line number but a subaddress by dialing. Accordingly, with ISDN, it is possible to specify a particular extension of a private branch exchange connected to the network and transmit a call directly to a corresponding extension terminal.

However, in this example, if the received call contains no called subaddress or there is no terminal corresponding to the received called subaddress, it is possible to specify a particular extension terminal to be called. Accordingly, it is necessary to ring or activate all the extension terminals corresponding to the line number, thus leading to the following problems.

(1) The probability that an unwanted person or terminal responding is high. As a result, a respondent or a responding terminal may respond to unnecessary communication which is not economical.

(2) If information is transmitted from one terminal to another terminal such as facsimile machines, an unrelated terminal may respond to the terminal at the transmitting side. As a result, secrets may leak or documents may be lost.

(3) Even if a predetermined party is informed of the subaddress at the receiving side in advance, an unwanted call from any party other than the predetermined party must be received. Accordingly, economic savings and traffic efficiency deteriorate.

SUMMARY OF THE INVENTION

It is therefore an object of the present invention to effectively utilize an extension terminal when an incoming call which specifies a destination terminal is received.

It is another object of the present invention to provide a private branch exchange which does not respond to an unwanted call by refusing an incoming call which contains no called-subaddress information element specifying a destination terminal, whereby the use efficiency of extension terminals is improved.

It is another object of the present invention to provide a private branch exchange which transmits, if a call contains no information which accurately specifies a destination terminal is received, information to that effect to the transmitting side.

It is another object of the present invention to provide a line exchange method which makes it possible to effectively utilize extension terminals connected to a private branch exchange by refusing an incoming call which contains no called-subaddress information element specifying a destination terminal.

To achieve the above and other objects, in accordance with one aspect of the present invention, there is provided a novel and improved private branch exchange which accommodates a plurality of extension terminals and which is arranged to effect line exchanges by specifying a destination terminal from among the extension terminals on the basis of a called-subaddress information element contained in the incoming information. Such a private branch exchange includes receiving means for receiving the incoming information containing the called-subaddress information element, decision means for making a decision as to whether the called-subaddress information element is contained in the incoming information received by the receiving means, and refusing means for refusing a call in accordance with the decision made by the decision means.

In accordance with another aspect of the present invention, there is provided a novel and improved private branch exchange which accommodates a plurality of extension terminals and which is arranged to effect line exchanges by specifying a destination terminal from among the extension terminals on the basis of a called-subaddress information element contained in the incoming information. Such a private branch exchange includes receiving means for receiving the incoming information containing the called-subaddress information element, decision means for making a decision as to whether connection with any one of the extension terminals can be made, on the basis of the incoming information received by the receiving means, and an informing means arranged to transmit, if the decision means determines that the connection cannot be made, information to that effect to a calling party.

In accordance with another aspect of the present invention, there is provided a novel and improved line exchange method for a private branch exchange which accommodates a plurality of extension terminals and which is arranged to effect line exchanges by specifying a destination terminal from among the extension terminals on the basis of a called-subaddress information element contained in incoming information. Such a method comprises the steps of receiving the incoming information containing the called-subaddress information element, making a decision as to whether the called-subaddress information element is contained in the incoming information received in the receiving step, and refusing the incoming information in accordance with the decision made by the decision-making step.

In accordance with another aspect of the present invention, there is provided a novel and improved line exchange method for a private branch exchange which accommodates a plurality of extension terminals and which is arranged to effect line exchanges by specifying a destination terminal from among the extension terminals on the basis of a called-subaddress information element contained in incoming information. Such a method comprises the steps of receiving the incoming information containing the called-subaddress information element, making a decision as to whether connection with any one of the extension terminals can be made, on the basis of the incoming information received in the receiving step, and transmitting, if the decision means determines that the connection cannot be made, information to that effect to a calling party.

In accordance with another aspect of the present invention, there is provide an exchange which accommodates a plurality of extension terminals, which includes receiving means for receiving a specifying address for specifying a particular extension terminal from an external line, exchanging means for effecting line exchange according to the received specifying signal, and responding means arranged to produce a voice response if the responding means determines that the result of reception by the receiving means is abnormal.

In accordance with another aspect of the present invention, there is provided an exchange which accommodates a plurality of extension terminals, which includes receiving means for receiving a specifying address for specifying a particular extension terminal from an external line, exchanging means for effecting line exchange according to the received specifying signal, first decision means for making a decision as to whether the result of reception by the receiving means is normal or abnormal, second decision means for making a decision as to whether a response by the specified particular extension terminal can or cannot be made, and responding means arranged to refuse a call if the result of reception by the receiving means is abnormal and if the response by the specified particular extension terminal cannot be obtained.

The above and other objects, features and advantages of the present invention will be apparent from the following description of preferred embodiments of the invention with reference to the accompanying drawings.

BRIEF DESCRIPTION OF THE DRAWINGS

FIGS. 6A and 6B are flowcharts showing the procedure of incoming-call processing executed in the second embodiment.

DESCRIPTION OF THE PREFERRED EMBODIMENTS

Figure 1:
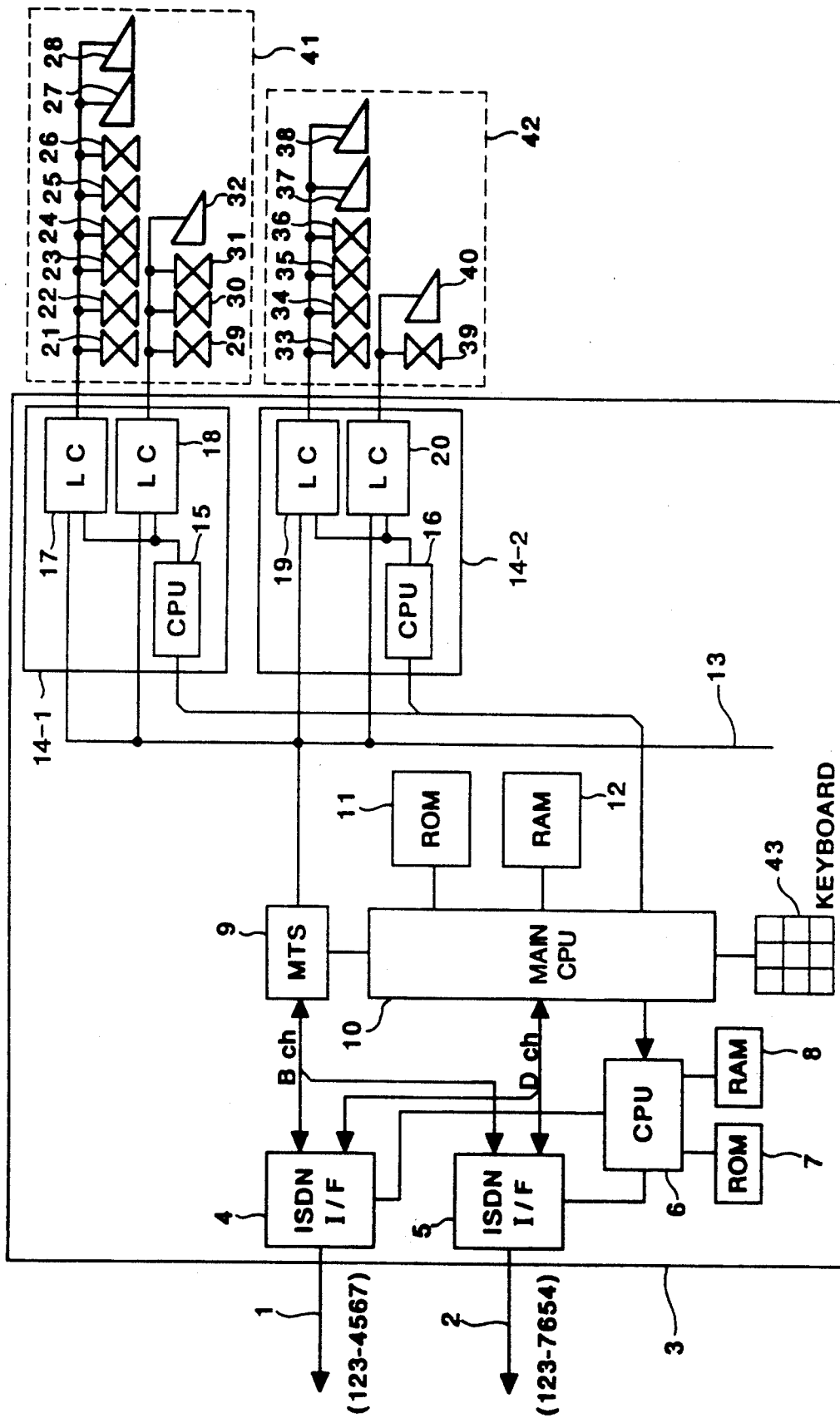
FIG. 1 is a block diagram showing the arrangement of a private branch exchange according to a first embodiment of the present invention.

Preferred embodiments of the present invention will be explained below in detail with reference to the accompanying drawings. In the following description, the same reference numerals are used to denote the same elements throughout several drawings.

Explanation of Arrangement (FIG. 1)

FIG. 1 is a block diagram showing the arrangement of a private branch exchange 3 according to the first embodiment.

The private branch exchange 3 of the first embodiment accommodates an ISDN line 1 whose line number is, e.g., 123-4567 and an ISDN line 2 whose line number is, e.g., 123-7654. The private branch exchange 3 also accommodates a terminal group 41 consisting of terminals 21-32 and a terminal group 42 consisting of terminals 33-40, and the terminal groups 41 and 42 correspond to the ISDN lines 1 and 2, respectively.

As illustrated, the private branch exchange 3 comprises the following major elements: ISDN interfaces (I/Fs) 4 and 5 which interface the corresponding ISDN lines 1 and 2, a CPU 6 for controlling the ISDN interfaces 4 and 5, a ROM 7 which stores a program for use in the CPU 6, a RAM 8 which is used as a work area by the CPU 6 during processing, a switching memory (MTS) 9 for effecting switching of channel B of each of the ISDN lines 1 and 2, a main CPU 10 for controlling all the elements of the private branch exchange 3, a ROM 11 which stores a procedure or program for use in the main CPU 10 which will be described later, a RAM 12 which is used as a work area by the CPU 10 during processing, a highway 13, extension interface cards 14-1 and 14-2 which accommodate the extension interface groups 41 and 42, and a keyboard 43 used to set subaddress information which specifies a destination terminal.

The extension interface card 14-1 which corresponds to the terminal group 41 includes a CPU 15 for controlling the terminal group 41 and extension interfaces (LCs) 17 and 18. Extension card 14-2 includes a CPU 16 for controlling the terminal group 42 and extension interfaces (LCs) 19 and 20. More extension cards may be added. ISDN telephones 21 to 26 and ISDN G4 facsimiles 27, 28 are connected to extension interface 17 as extension terminals, while ISDN telephones 29 to 31 and an ISDN G4 facsimile 32 are connected to extension interface 18 as extension terminals, thereby forming the terminal group 41 which responds to a incoming call on the ISDN line 1.

Similarly, ISDN telephones 33 to 36 and ISDN G4 facsimiles 37, 38 are connected to extension interface 19 as extension terminals, while an ISDN telephone 39 and an ISDN G4 facsimile 40 are connected to extension interface 20 as extension terminals, thereby forming a terminal group 42 which responds to an incoming call on the ISDN line 2.

Explanation of Initialization

The following is an explanation of an initializing process in which a user of the private branch exchange 3 having the above-described arrangement sets the number of each extension terminal to be activated with respect to an ISDN line having an incoming call.

At first, any one of the extension interfaces 17 to 20 is selected in accordance with which of the ISDN line 1 or 2 has an incoming call, and it is determined which extension terminals, 21 to 40, should be rung or activated. Then, the subaddress of each extension terminal 21 to 40 which is connected to any one of the extension interfaces 17 to 20, is set. In the first embodiment, it is assumed that the subaddresses of the respective extension terminals 21 to 40 are identical to the corresponding reference numerals 21 to 40. If there is an incoming call on the ISDN line 1, the private branch exchange 3 is set so that the extension terminals connected to the extension interfaces 17 and 18, that is, the extension terminals specified by subaddresses 21 to 32, are informed of the reception of the incoming call. If there is an incoming call on the ISDN line 2, the private branch exchange 3 is set so that the extension terminals connected to the extension interfaces 19 and 20, that is, the extension terminals specified by subaddresses 33 to 40 are informed of the reception of the incoming call.

The setting of the above-described conditions such as subaddresses is performed by using the keyboard 43. For example, the following data may be sequentially entered from the keyboard 43:

```
"#1 = 17 = 21, 22, 23, 24, 25, 26, 27, 28",
"#1 = 18 = 29, 30, 31, 32",
"#2 = 19 = 33, 34, 35, 36, 37, 38",
"#2 = 20 = 39, 40".
```

The input data are stored in the RAM 12 and, in addition, the respective extension terminals set their own subaddresses. The manner of setting differs for different kinds of extension terminals but, since it is not related to the gist of the present invention, detailed explanation is omitted.

Figure 2:
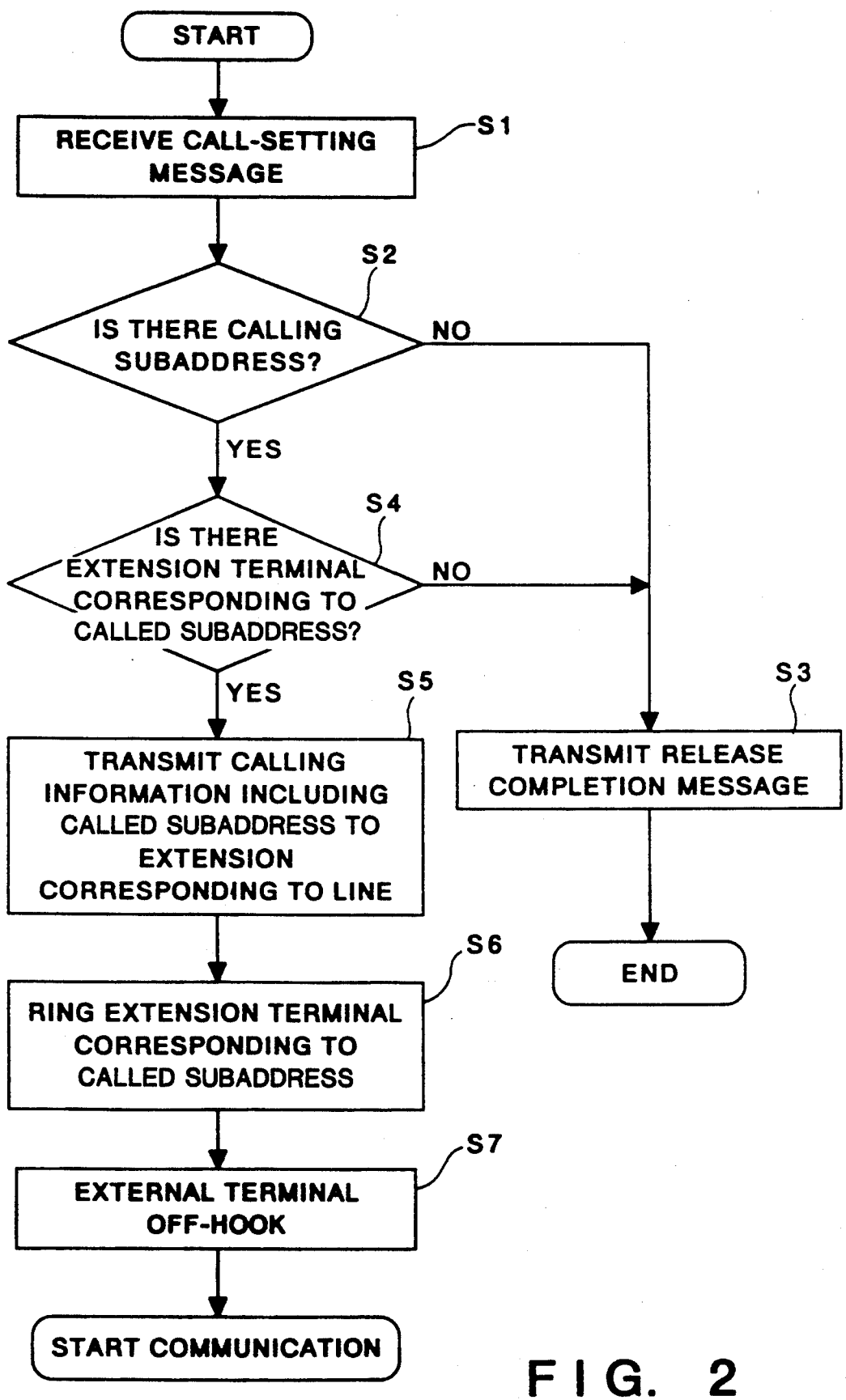
FIG. 2 is a flowchart showing the procedure of incoming-call processing executed in the first embodiment.

Explanation of Procedure (FIG. 2)

The procedure executed by the CPU 10 when an incoming call is received in the first embodiment will now be explained in detail with reference to the flowchart of FIG. 2.

When a call-setting message is received through the ISDN interface 4 from the ISDN line 1 in Step S1, the process proceeds to Step S2, where the CPU 10 detects a called-subaddress information element contained in the call-setting message. If the called-subaddress information element is detected, the process proceeds to Step S4, where the CPU 10 retrieves extension terminal subaddress information stored in the RAM 12 to specify an extension terminal corresponding to the called subaddress. This retrieval is implemented by comparing the subaddresses 21-32 of the extension terminals connected to the extension interfaces 17 and 18 with the received called subaddress and the incoming call on the ISDN line 1 and determining whether there is a corresponding extension terminal.

For example, if the called subaddress received from the ISDN line 1 is "21", it is determined from the aforesaid comparison that the extension terminal of subaddress 21 exists. Accordingly, the process proceeds to Step S5, where the CPU 10 informs the CPU 15 for controlling the extension interfaces 17 and 18 that the incoming call has been received. Then, the call-setting message is transmitted from the extension interface 17 to the extension terminals 21 to 28. From among the extension terminals 21 to 28 which have received the call-setting message, the extension terminal 21 having an identical subaddress transmits a response message to the extension interface 17 (Step S6). In the meantime, when the CPU 15 informs the CPU 10 that the extension terminal 21 has transmitted the response message (Step S7), the CPU 10 transmits information to that effect to the ISDN interface 4. The ISDN interface 4 in turn transmits the response message to the corresponding network, thereby starting communication.

When the extension terminal 21 receives the call-setting message, if neither high-order protocol layer (i.e., defining a type of communication service) matching nor low-order protocol layer (i.e., defining transmission speed and/or format) matching is obtained, the extension terminal 21 transmits to the extension interface 17 a release completion message containing a reason-indicating information element which indicates the reason for the disagreement between terminal attributes, thereby refusing the incoming call.

For example, if a called subaddress received from the ISDN line 1 is "33", it is determined from the aforesaid comparison that an extension terminal of corresponding subaddress 33 does not exist in the extension terminal group 41. Accordingly, the process proceeds to Step S3, where the CPU 10 informs ISDN interface 4 of the refusal of the incoming call. ISDN interface 4 in turn transmits to the corresponding network a release completion message containing a reason-indicating information element which indicates the reason for the disagreement between terminal attributes, thereby refusing the incoming call.

If no called subaddress is detected in the received call-setting message in Step S2, the process proceeds to Step S3, where the CPU 10 informs ISDN interface 4 of the refusal of the incoming call. ISDN interface 4 in turn transmits to the corresponding network a release completion message containing a reason-indicating information element which indicates the reason for the disagreement between terminal attributes, thereby refusing the incoming call and completing the process.

Figure 3:
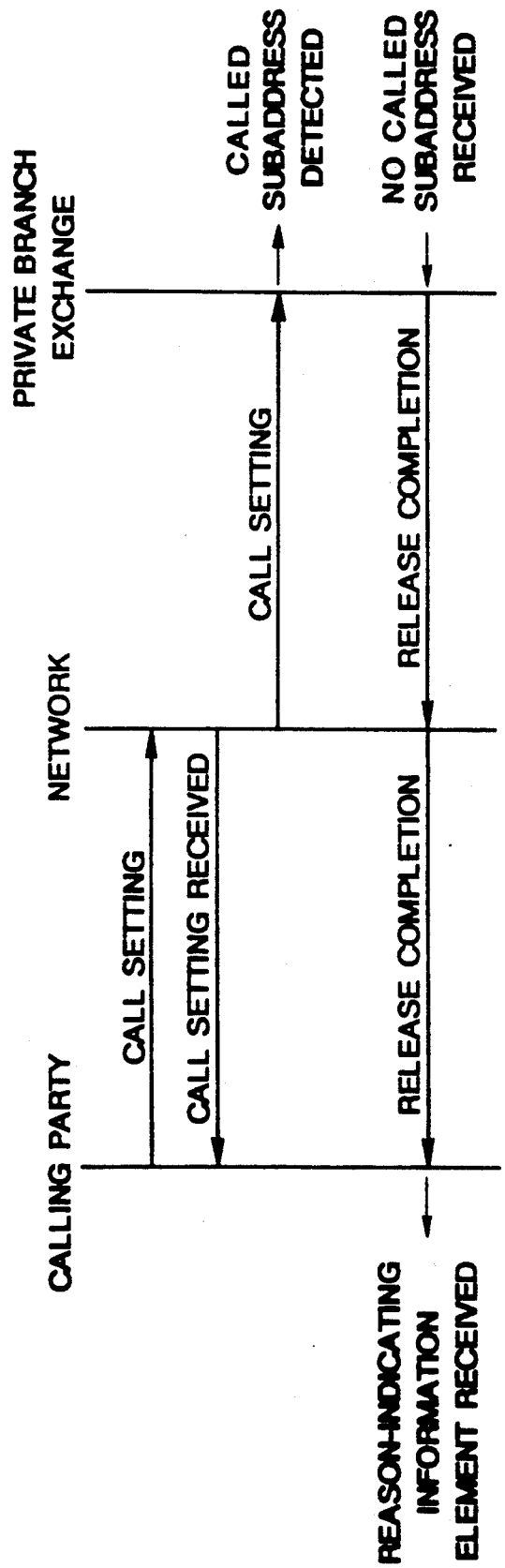
FIG. 3 is a view which serves to illustrate the processing of incoming call having no called subaddress.

FIG. 3 is a view showing a protocol for, as described above, transmitting a release completion message containing reason-indicating information element and refusing an incoming call when no called subaddress is contained in a call-setting message received from a calling party.

In accordance with the first embodiment described above when a connection between a line and an extension is not possible because no extension terminal corresponds to the call-setting message sub-address or the sub-address is incorrect, the main CPU 10 analyzes the received call-setting message included in an incoming call and retrieves the extension terminal subaddress information stored in the RAM 12, and then compares the subaddresses of the extension terminals with the subaddress contained in the received call-setting message and determines that it is not possible to respond to the incoming call. According to the first embodiment, the following advantages can be enjoyed.

(1) It is possible to prevent an operator or a terminal at the receiving side from becoming busy with unnecessary communication, whereby the efficiency of office work is improved.

(2) Even if information is transmitted from one terminal to another terminal, such as facsimile machines, predetermined subaddresses can be identified to prevent an unrelated terminal from responding to the terminal at the transmitting side. Accordingly, it is possible to realize the reliable retention of secrets and also to prevent documents from being lost by accidents.

(3) If a predetermined party is informed of the subaddress of a receiving side in advance, it is not necessary to respond to any unwanted call from any party other than the predetermined parties. Accordingly, economic savings and traffic efficiency can be improved.

The first embodiment is arranged so that the keyboard in the private branch exchange is used to set the subaddress of each extension terminal. However, if the contents set at the respective extension terminals are collected and set by the main CPU 10 through the extension interface controlling CPU, data having similar contents can be stored on the RAM 12. With this arrangement, it is possible to simplify the manner of setting.

The first embodiment is also arranged so that, whether a call-setting message is not provided with a called-subaddress information element or a received called-subaddress information element does not coincides with any extension terminal subaddress, a release completion message containing the same reason-identifying information element is indicated before disconnection. However, this arrangement may be disadvantageous in that a calling party cannot clearly distinguish between the reasons for disconnection. To solve this problem, in one improved form of the first embodiment, disconnection messages provided with user information may be prepared. In this improved form, it is possible to inform a calling party of detailed reasons for disconnection.

The first embodiment is arranged so that the extension interfaces are equivalent to the respective ISDN interfaces and so that eight extension terminals can be connected to a bus extending from one extension interface. However, it is not necessary to dispose an arrangement equivalent to the ISDN interfaces on the extension side of the private branch exchange.

Figure 4:
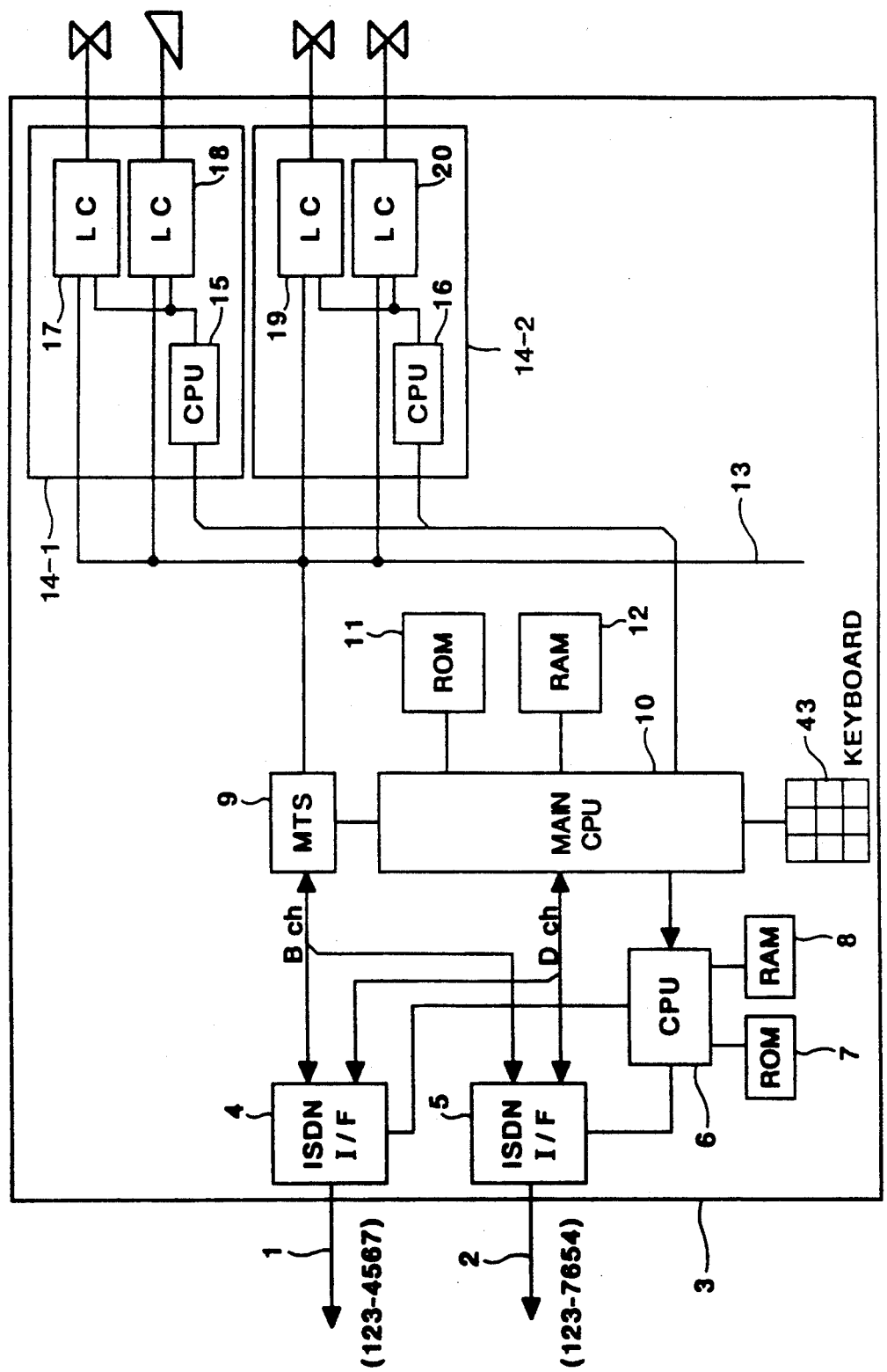
FIG. 4 is a block diagram showing a modification of the first embodiment.

More specifically, it is also possible to utilize an arrangement in which, as shown in FIG. 4, one extension terminal can be connected to each extension interface and a subaddress is assigned to each extension terminal. In this arrangement, when the main CPU 10 receives a called-subaddress information element, an exchange switch is switched to connect the line to an extension interface including an extension terminal having a corresponding subaddress.

A second embodiment of the present invention will be explained in detail below with reference to the corresponding drawings.

Figure 5:
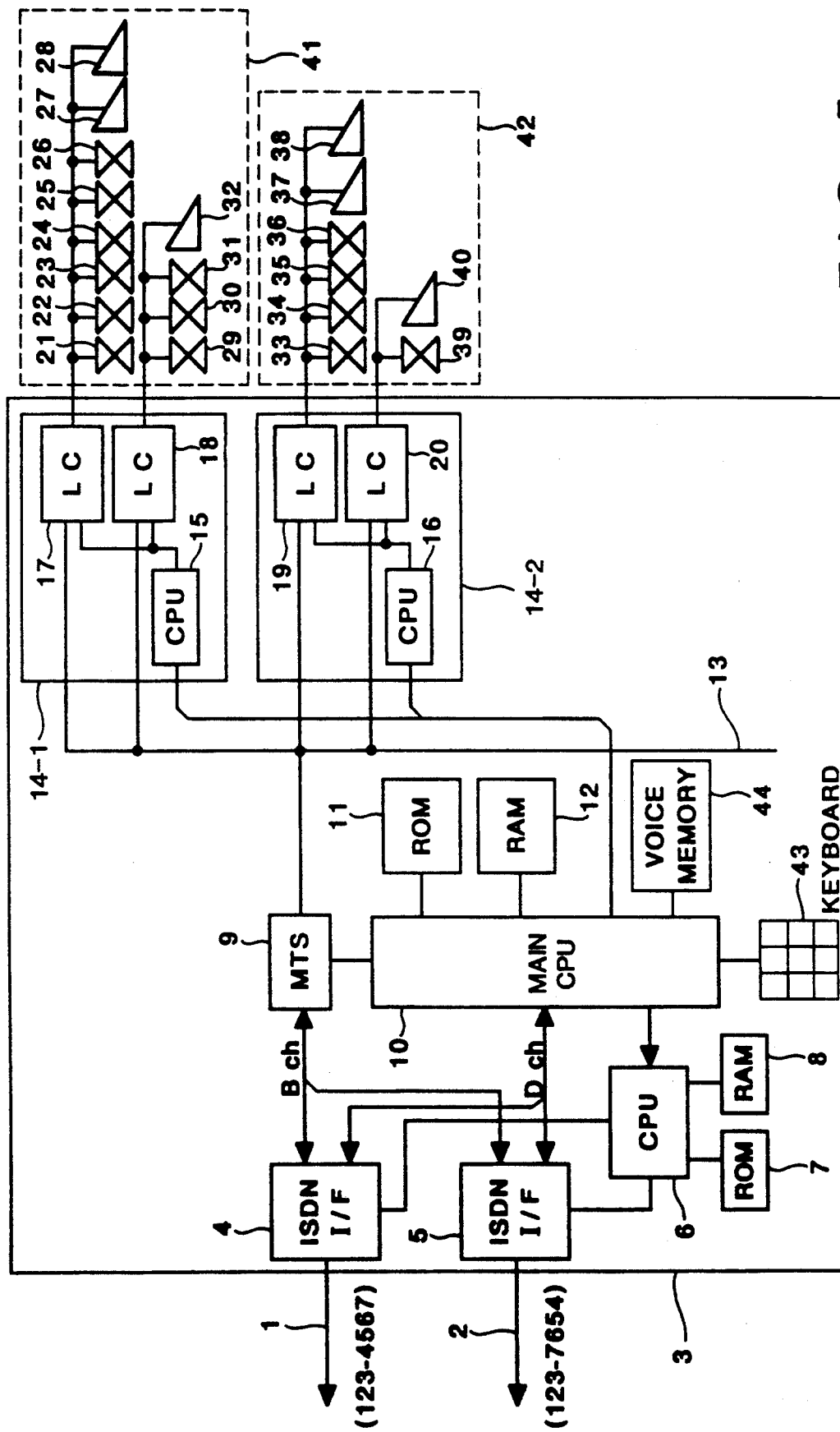
FIG. 5 is a block diagram showing the arrangement of a private branch exchange according to a second embodiment of the present invention.

The second embodiment is similar to the first embodiment except that a voice-data storing memory 44 is added to the arrangement of FIG. 1 as shown in FIG. 5. If no called subaddress is detected or it is impossible to make the connection between a line and an extension terminal, a recorded voice message is transmitted from the voice-data storing memory 44 to give a calling party information to that effect.

Recording of Voice Data

A process for recording a voice message to be transmitted to a calling party when there is no called subaddress and storing the voice message in the voice-data storing memory 44 shown in FIG. 5, will now be explained below.

As will be explained later, it is necessary for a respondent to send messages having different contents for different situations. The second embodiment is therefore arranged so that different kinds of voices can be stored for different situations. For example, if a received call-setting message contains no called subaddress and it is impossible to specify a particular extension terminal and connect a corresponding line thereto, the voice message of a response voice type 1 is transmitted to the associated network. If a received call-setting message contains a called subaddress but there is no extension terminal having a corresponding subaddress, the voice message of a response voice type 2 is transmitted to the network.

These voice messages are stored at the respective addresses of the voice-data storing memory 44 which are defined according to individual situations.

The voice messages are recorded in the following manner. First of all, an operator enters "123#1#" by actuating the dial key of an extension terminal, for example, a telephone, so that a response message for a call-setting message having no called subaddress can be recorded. Then, the operator may say at the microphone of the receiver of the telephone, for example, "No connection can be made because there is no called subaddress." Thereafter, when the operator presses a # key, this voice message is stored at address 1 of the voice-data storing memory 44.

The aforesaid input number "123" is an identification number which serves to prevent recording error.

If a received call-setting message contains a called subaddress but there is no extension terminal having a corresponding subaddress, the operator can enter "#123#2#" to start recording. In a manner similar to the aforesaid manner, a voice message, for example, "The subaddress is wrong. Please check it and redial." is stored at address 2 of the voice memory 44.

Figure 6B:
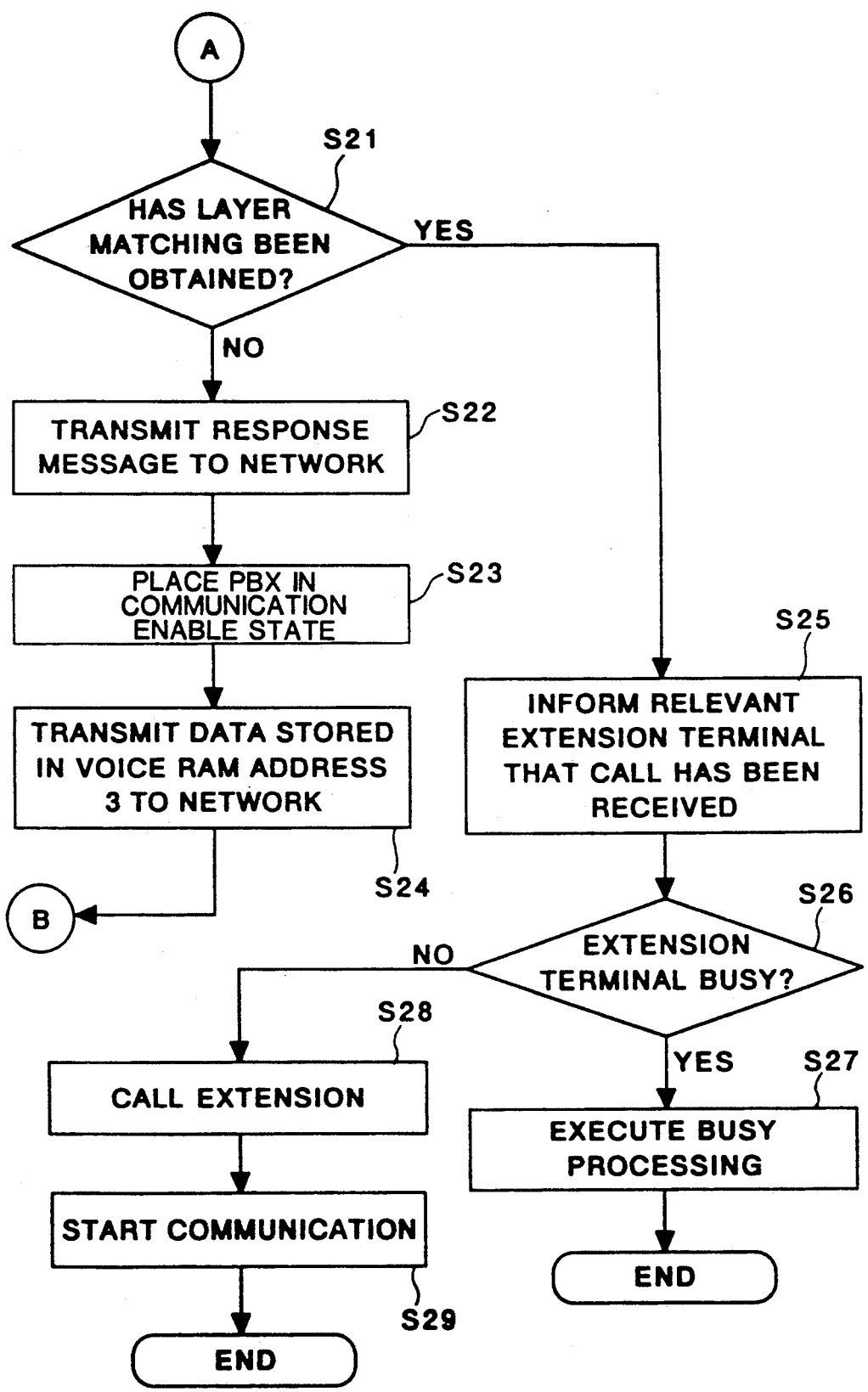

Explanation of Procedure (FIG. 6)

The procedure executed by the CPU 10 when an incoming call is received in the second embodiment will be explained below with reference to the flowchart shown in FIG. 6.

When a call-setting message is received through ISDN interface 4 from ISDN line 1 in Step S11, the process proceeds to Step S12, where the CPU 10 detects a called-subaddress information element contained in the call-setting message. In Step S13, a decision is made as to the result of the detection performed in Step S12. If it is determined in Step S13 that there is a called subaddress, the process proceeds to Step S17, where the CPU 10 retrieves extension terminal subaddress information stored in the RAM 12 to specify an extension terminal corresponding to the called subaddress. This retrieval is implemented by comparing the subaddresses 21-32 of the extension terminals connected to the extension interfaces 17 and 18 with the received called subaddress and the incoming call on the ISDN line 1 and determining whether there is a corresponding extension terminal.

For example, if the called subaddress is "21", it is determined from the aforesaid comparison that the extension terminal of subaddress 21 exists. Accordingly, the process proceeds to Step S21, where the CPU 10 checks protocol layer matching. Protocol layer-matching information is stored in the RAM 12 in correspondence with each extension terminal subaddress information. If it is determined that high-order protocol layer matching, low-order protocol layer matching and the like are obtained, the process proceeds to Step S25, where the CPU 10 informs the CPU 15 for controlling the extension interfaces 17 and 18 that the incoming call has been received. Then, the call-setting message is transmitted from the extension interface 17 to extension terminals 21 to 28. From among extension terminals 21 to 28 which have received the call-setting message, extension terminal 21 having an identical subaddress transmits a response message to extension interface 17.

If it is determined in Step S26 that the corresponding extension terminal is busy, the process proceeds from Step S26 to Step S27, where busy processing is executed. In the busy processing, a reason-indicating information element is transmitted to the CPU 10 through the extension interface 17, and the CPU 10 is informed that the extension terminal 21 is busy. CPU 10 transmits in channel information (or busy tone) to the network through ISDN interface 4. However, if extension terminal 21 is not busy, the process proceeds to Step S28. In Step S28, when CPU 10 calls the extension terminal 21 and is informed by the CPU 15 that the extension terminal 21 has responded, CPU 10 transmits information to that effect to the ISDN interface 4. ISDN interface 4 in turn transmits a response message to the corresponding network, thereby starting communication (Step S29).

If it is determined in Step S21 that neither high-order protocol layer matching nor low-order protocol layer matching is obtained, the process proceeds to Step S22, where a response message is transmitted to the network. In Step S23, the private branch exchange 3 is placed in a transparent communication-enable state with respect to the network. In Step S24, a calling party is informed that layer matching is not obtained. Specifically, voice data which represents that layer matching is not obtained, stored at address 3 of the voice-data storing memory 44, is transmitted to the network, thereby informing the calling party of the reason why the desired extension terminal does not respond.

If a called subaddress received from the ISDN line 1 is "33", the called subaddress 33 is compared with the data stored in the RAM 12. If, as a result of the comparison of the called subaddress with the data stored in RAM 12 in step 17, it is determined that an extension terminal of corresponding subaddress 33 does not exist in the extension terminal group 41, and the process proceeds to Step S18, where a response messages is transmitted to the network. In Step S19, the private branch exchange 3 is placed in a communication-enable state. The process proceeds to Step S20, where the voice message "The subaddress is wrong. Please check it and redial." is read from address 2 of the voice-data storing memory 44 and transmitted to the network.

If no called subaddress is detected in the received call-setting message in Step S13, the process proceeds to Step S14, where CPU 10 informs ISDN interface 4 that a response message will be transmitted. When the private branch exchange 3 is placed in a communication-enable state in Step S15, the process proceeds to Step S16. In Step S16, the voice data stored at address 1 of the voice-data storing memory 44 is transmitted to the network. Through the above-described processing, the voice message "No connection can be made because there is no called subaddress." is transmitted to the calling party as a response voice, whereby the calling party can understand the reason why no connection can be made. In the event that the calling party is a facsimile and the called party is a facsimile, a voice message may be received by an operator of the calling facsimile if voice facilities are provided at the calling facsimile.

As is apparent from the foregoing, the second embodiment has the following advantage in addition to the advantages of the above-described first embodiment. Since the reason why no connection can be made is transmitted to a calling party by a voice signal, the calling party can take adequate action based on detailed information, thereby efficiently performing work.

Although in the second embodiment the voice messages are stored in the voice memory 44 which may be a RAM, such a voice message may be recorded on a magnetic tape or the like. Whether the memory or the magnetic tape is used, it is possible to enjoy equivalent advantages. The use of magnetic tape makes it possible to transmit a voice message of long duration.

Figure 7:
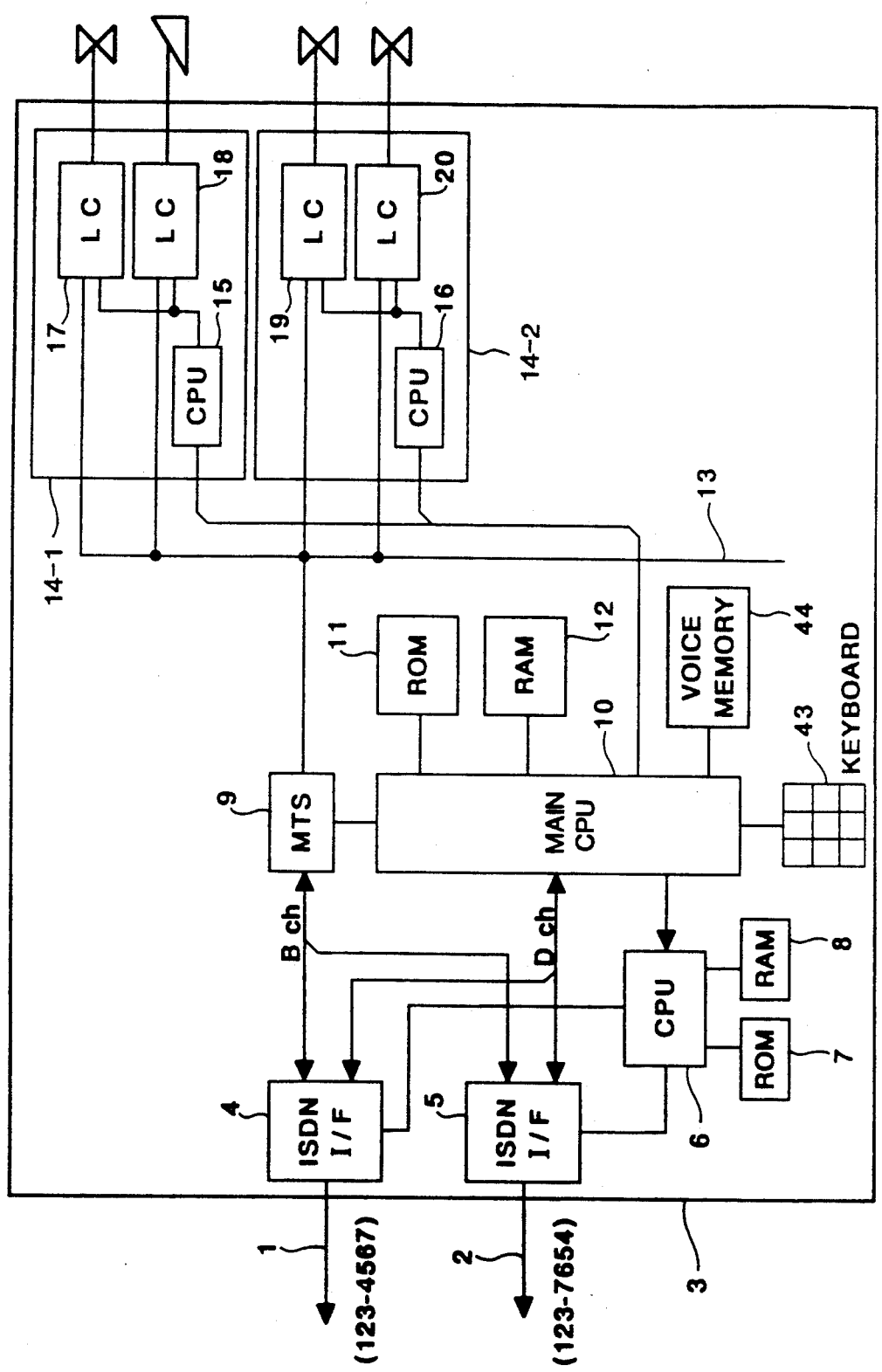
FIG. 7 is a block diagram showing a modification of the second embodiment.

In addition, the arrangement of the second embodiment is not limited to that shown in FIG. 5. It is also possible to utilize an arrangement in which, as shown in FIG. 7, one extension terminal is connected to each extension interface.

As is apparent from the foregoing, in either of the above described embodiments, since an incoming call including no called-subaddress information element which specifies a particular destination terminal is refused, it is not necessary to responds to an unwanted call. Accordingly, it is possible to improve the use efficiency of extension terminals. In addition, since the refusal of an incoming call can be transmitted to a calling party, the calling party can understand the reason why the call has been refused, and can correctly redial.

Both embodiments have been explained with reference to examples in which the present invention is applied to a private branch exchange connected to an ISDN line. However, the present invention is not limited to the above-described arrangement and can be applied to, for example, a private branch exchange connected to an analog line. In this arrangement, if a PB signal which is transmitted from a calling party by direct inward dial service is not correct, a voice response is transmitted.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A private branch exchange which accommodates a plurality of extension terminals, comprising:
    an integrated services digital network (ISDN) interface for connecting to an ISDN;
    memory means for storing a plurality of subaddress information elements of the plurality of extension terminals;
    decision means for deciding whether or not a subaddress information element is contained in a call-setting message which is included in an incoming call and is received via the ISDN, and whether or not the subaddress information element in the call-setting message corresponds to one of the plurality of subaddress information elements stored in said memory means; and
    refusing means for refusing the incoming call by controlling said ISDN interface to transmit a release completion message containing a reason-indicating information element instead of a response message in accordance with the decision made by said decision means.

2. The exchange according to claim 1, wherein said refusing means refuses the incoming call if the call-setting message contains no subaddress information element.

3. A private branch exchange according to claim 1, wherein said refusing means refuses said call if there is no extension terminal corresponding to said subaddress information element.

4. The exchange according to claim 1, wherein said refusing means transmits a release message containing a reason-indicating information element indicating the reason.

5. The exchange according to claim 1, wherein said decision means comprises a memory for storing a subaddress of each of the plurality of extension terminals and makes a decision on the basis of the subaddress stored in the memory.

6. The exchange according to claim 1, where in said refusing means refuses the incoming call by controlling said ISDN interface to transmit a release message.

7. A private branch exchange which accommodates a plurality of extension terminals, comprising:
   an integrated services digital network (ISDN) interface for connecting to an ISDN;
   decision means for deciding whether or not a response should be made with any one of said extension terminals, on the basis of a subaddress information element contained in a call-setting message which is included in an incoming call and is received via the ISDN; and
   informing means for, if said decision means determines that no response should be made, informing a calling party by means of controlling said ISN interface to transmit a release message containing a reason-indicating information element to said ISDN.

8. The exchange according to claim 7, wherein said decision means determines that no response should be made if the call-setting message contains no subaddress information element.

9. The exchange according to claim 7, wherein said decision means determines that no response should be made if there is not extension terminal corresponding to said subaddress information element.

10. The exchange according to claim 7, wherein said decision means determines that no response should be made if layer matching is not obtained.

11. The exchange according to claim 7, wherein said decision means comprises a memory for storing a subaddress of each of the plurality of extension terminals and makes a decision on the basis of the subaddress stored in the memory.

12. A line exchange method for a private branch exchange which comprises a memory for storing a plurality of subaddress elements of a plurality of extension terminals, comprising the steps of:
    receiving from an integrated services digital network (ISDN) an incoming call including a call-setting message;
    analyzing a subaddress information element contained in said call-setting message received in said receiving step; and
    refusing the incoming call by transmitting a release message containing a reason-indicating information element instead of a response message to the ISDN in accordance with a comparison between the subaddress element analyzed at said analyzing step and the plurality of subaddress elements of the plurality of extension terminals stored in memory.

13. The method according to claim 12, wherein in the analyzing step, it is determined whether or not the subaddress information element is contained in the call-setting message.

14. The method according to claim 12, wherein in the analyzing step, it is determined whether or not any one of said extension terminals corresponds to the subaddress contained in the call-setting message.

15. The method according to claim 12, wherein in the refusing step, the incoming call is refused by the release message transmitted to the ISDN.

16. A line exchange method for a private branch exchange which accommodates a plurality of extension terminals, comprising the steps of:
    receiving a call-setting message from an integrated services digital network (ISDN);
    deciding whether or not a response should be made with any one of said extension terminals, on the basis of a subaddress information element contained in the call-setting message received in said receiving step; and
    transmitting, if it is determined in said deciding step that no response message should be transmitted, a release message containing a reason-indicating information element to a calling party.

17. The method according to claim 16, wherein in the deciding step, if the call-setting message does not contain a subaddress information element, it is decided not to respond to the incoming call.

18. The method according to claim 16, wherein in the deciding step, if there is no extension terminal which corresponds to the subaddress contained in the call-setting message, it is decided not to respond to the incoming call.

19. The method according to claim 16, wherein in the deciding step, it is determined whether or not to respond to the incoming call in accordance with a subaddresses of the plurality of extension terminals stored in a memory.

20. An exchange which accommodates a plurality of extension terminals, comprising:
    an integrated services digital network (ISDN) interface for connecting to an ISDN;
    memory means for storing a plurality of subaddress information elements of the plurality of extension terminals;
    exchanging means for effecting line exchange according to a subaddress information element contained in a call-setting message which is included in an incoming call and is received by said ISDN interface; and
    decision means for deciding whether or not the subaddress information element is contained in the call-setting message, or whether or not any one of the plurality of subaddress information elements stored in the memory corresponds to the subaddress information element contained in the call-setting message,
    wherein said decision means refuses the incoming call by controlling said ISDN interface to transmit a release message containing a reason-indicating information element instead of a response message if said decision means determines that no subaddress information element is contained in the call-setting message or no one of the subaddress information elements stored in the memory corresponds to the subaddress contained in the call-setting message.

21. The exchange according to claim 20, wherein said decision means comprises a memory for storing a subaddress of each of the plurality of extension terminals and makes a decision on the basis of the subaddress stored in the memory.

22. The exchange according to claim 20, wherein said decision means refuses the incoming call by controlling said ISDN interface to transmit a release message to said ISDN.

* * * * *

UNITED STATES PATENT AND TRADEMARK OFFICE
CERTIFICATE OF CORRECTION

PATENT NO. : 5,291,549
DATED : March 1, 1994
INVENTOR(S) : MICHIHIRO IZUMI

It is certified that error appears in the above-indentified patent and that said Letters Patent is hereby corrected as shown below:

COLUMN 3

Line 4, "provide" should read --provided--.

COLUMN 4

Line 53, "line" should read --lines--.

COLUMN 7

Line 5, "cides" should read --cide--.

COLUMN 10

Line 7, "responds" should read --respond--.

COLUMN 11

Line 6 "where in" should read --wherein--.
Line 22, "ISN" should read --ISDN--.
Line 32, "not" should read --no--.

UNITED STATES PATENT AND TRADEMARK OFFICE
CERTIFICATE OF CORRECTION

PATENT NO. : 5,291,549
DATED : March 1, 1994
INVENTOR(S) : MICHIHIRO IZUMI

It is certified that error appears in the above-indentified patent and that said Letters Patent is hereby corrected as shown below:

COLUMN 12

Lines 29-30, "a subaddresses" should read --subaddresses--.

Signed and Sealed this

Twenty-ninth Day of November, 1994

Attest:

BRUCE LEHMAN

Attesting Officer     Commissioner of Patents and Trademarks